H. A. WOOFTER.
MANUFACTURE OF ARTICLES OF RUBBER.
APPLICATION FILED DEC. 12, 1919.
1,355,206. Patented Oct. 12, 1920.
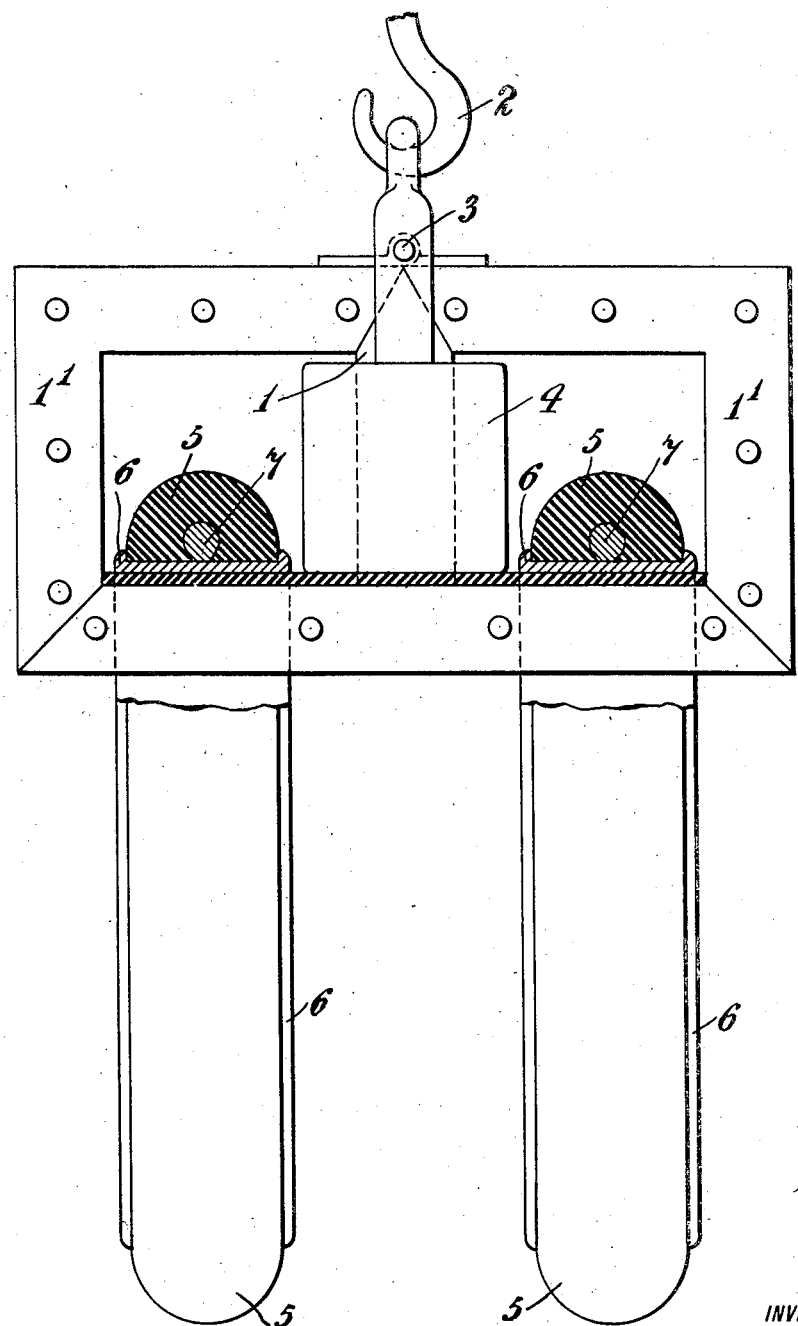
INVENTOR
Herbert A. Woofter
BY
Townsend & Decker
ATTORNEYS

UNITED STATES PATENT OFFICE.

HERBERT ADDISON WOOFTER, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

MANUFACTURE OF ARTICLES OF RUBBER.

1,355,206.

Specification of Letters Patent.  Patented Oct. 12, 1920.

Application filed December 12, 1919. Serial No. 344,347.

*To all whom it may concern:*

Be it known that I, HERBERT A. WOOFTER, a citizen of the United States, and a resident of Swampscott, in the county of Essex and State of Massachusetts, have invented certain new and useful Improvements in Manufacture of Articles of Rubber, of which the following is a specification.

My invention relates to the manufacture of articles of rubber formed upon a metal core or mold which requires to be removed by melting it out.

My invention relates more particularly to the manner of supplying the heat for the simultaneous operation of vulcanizing and removing said core by melting.

Briefly stated the invention consists in placing the article with its fusible core in a magnetic field adapted to generate heating current in the core and using said current as a source both of vulcanizing heat and fusing heat for melting out said core.

While my invention is capable of use in manufacturing numerous articles made of rubber, I have, for illustration only, shown it as applied to the manufacture of solid rubber vehicle tires.

In carrying out my invention the magnetic field by whose action the heating currents are generated in the core, may be the magnetic field of any device but preferably I use the magnetic field of a transformer of the step-down type or type commonly employed for generating welding, riveting or metal working currents in a secondary circuit and apply the rubber article with metal core in position in said transformer to operate as the secondary thereof.

In the drawings I have shown a construction of transformer that may be conveniently used and may be employed for conducting the operation simultaneously upon two articles, such as solid rubber vehicle tires, at once.

In said drawings 1 indicates the core of the transformer and 2 a hook by which the transformer may be suspended. 1' indicates sections of the transformer core hinged as at 3 and adapted to be opened out and permit the article, such as the rubber tire, to be inserted in position to operate as to its metal core as the secondary of the transformer.

4 indicates the usual primary coil of the transformer. The solid rubber tire is shown in section at 5 while 6 indicates the steel rim upon which the solid tire is usually mounted. 7 indicates the core upon which the rubber is molded and which determines the shape and size of the hollow space within the rubber tire. The metal used for this core 7 is a low melting point metal fusing at about 300° F. When the tire molded upon said core is inserted in place as indicated in the drawing to occupy the position of the secondary of the transformer and alternating current of proper voltage is supplied to the primary 4, core 7, as well as the metal rim 6, becomes the seat of heating electric currents generated in the metal which is in the magnetic field of the transformer and said currents circulating in said core and rim, heat the same and supply the necessary heating effects for vulcanizing the material of the articles in process of manufacture and the metal of the core becomes heated up by the action of said currents to the fusing point, so that it will be melted and flow out through a suitable opening leaving the required air space in the heart of the tire. After completing the vulcanizing and melting out of the core 7, the tire or tires may be removed by simply swinging back the sections 1' of the transformer core.

What I claim as my invention is:—

1. The herein described improvement in manufacturing hollow articles of rubber, consisting in molding the rubber upon a fusible core and vulcanizing the material and melting out the core by placing the article in a magnetic field adapted to generate heating current in said core to vulcanize the material and melt out said core.

2. The herein described method of manufacturing rubber vehicle tires having an air space in the heart of the tire, consisting in molding the same upon a fusible core and vulcanizing the tire and fusing out said core by utilizing the metal of the core as the seat of heating electric currents generated therein by locating it in a magnetic field.

3. The herein described method of manufacturing rubber vehicle tires having an air space in the heart of the tire, consisting in molding the same upon a fusible core and vulcanizing the tire and fusing out said core by utilizing the metal of the core as the seat of heating electric currents generated therein by locating it in a magnetic field of a transformer to act as the secondary thereof.

4. The herein described improvement in manufacturing solid rubber vehicle tires, consisting in utilizing the fusible core and the metal rim holding said tire as the closed circuit secondary of the heating transformer whereby the heating currents generated in said core and rim may act as the heating agent for vulcanizing the tire and melting out said core.

5. The herein described improvement in producing articles of manufacture molded upon a core, consisting in employing a conducting material for the core and removing said core by including it in an electric circuit carrying heating currents of sufficient volume to fuse said core.

6. The herein described improvement in manufacturing hollow articles of rubber molded upon a metal core, consisting in removing the core by including it in a circuit carrying heating currents of sufficient volume to fuse the same.

7. The herein described improvement in manufacturing hollow articles of rubber molded upon a metal core, consisting in locating said core in a magnetic field adapted to generate heating currents therein of sufficient volume to fuse said core.

8. The herein described improvement in producing hollow articles of manufacture, consisting in molding the article upon a metal core and removing said core by making it the seat of heating electric currents generated therein while it is located in the magnetic field.

Signed at Lynn, in the county of Essex, and State of Massachusetts, this 10th day of December, A. D. 1919.

HERBERT ADDISON WOOFTER.

Witnesses:
M. H. MacIver,
E. S. Richardson.